C. G. DUNCAN.
TRAP.
APPLICATION FILED MAR. 9, 1914.
1,138,943.
Patented May 11, 1915.
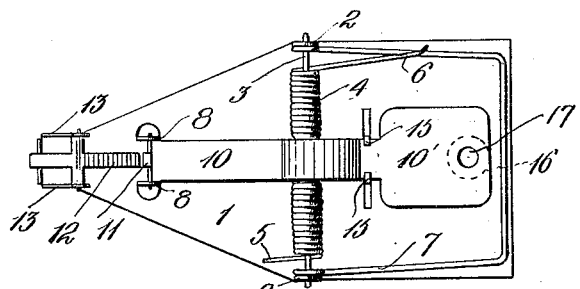
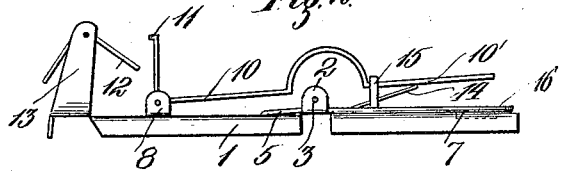
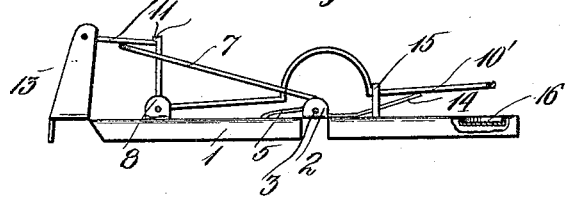

UNITED STATES PATENT OFFICE.

CHARLES G. DUNCAN, OF LOS ANGELES, CALIFORNIA, ASSIGNOR OF ONE-HALF TO JOHN MARSTON, OF LOS ANGELES, CALIFORNIA.

TRAP.

1,138,943.     Specification of Letters Patent.     Patented May 11, 1915.

Application filed March 9, 1914. Serial No. 823,595.

*To all whom it may concern:*

Be it known that I, CHARLES G. DUNCAN, a citizen of the United States, residing at Los Angeles, in the county of Los Angeles and State of California, have invented a certain new and useful Improvement in Traps, of which the following is a specification.

My invention relates to an improvement in traps for animals and particularly to that class of traps employing a spring actuated jaw and a bait carrying tripping pedal. In this type of device, the jaw is held in operative position by a lever, which in turn is held by a pedal, sensitive to the slightest touch for actuation. When setting the trap, the jaw must be held down by one hand against the tension of the spring, while with the other hand the lever is made to catch in the tripping pedal. On account of the overbalance of the pedal, particularly with the bait thereon, and the small perch which the lever must have on it to enable it to act quickly, it not infrequently happens that when the hold on the jaw is released, the lever, not being perfectly caught in the pedal, will slip engagement therewith, thus leaving the jaw free to move under the tension of the strong spring usually used. In so doing, the finger or other member of the operator is apt to be injured, and consequently the setting of the trap must be made with a great amount of care and patience.

An object of this invention is to avoid this danger and to provide a simple, economical and effective trap in which the setting is positive and practically automatic, and free from any liability of accidental tripping. These and other objects are accomplished by the device shown in the accompanying drawing, in which, Figure 1, is a plan view of the trap embodying my invention. Fig. 2, is a side elevation, and Fig. 3, is a side elevation, showing the jaw set for operation.

The invention comprises a base 1, preferably of metal, provided with integral upturned flanges 2, forming a bearing for a rod 3, around which is coiled or on which is mounted a helical spring 4, one end 5, of which rests on the face of said base, and the other end 6, of which engages and exerts tension on one arm of a wire, preferably U-shaped jaw 7, loosely attached to said rod 3. Pivotally mounted in flanges 8, on said base, is a lever 10, the free end 10', of which extends within the space formed by said jaw 7, when in normal inoperative position, such free end forming substantially a pedal and serving to receive a suitable bait. Integral with the other end of said lever 10, and extending upwardly at right angles thereto and in line with the point of its pivotal bearing, is a catch 11, held normally within the path of travel of a jaw holding finger 12, pivotally disposed in integral supports 13, rising vertically from said base 1, by a spring 14, engaging the underside of said lever preferably near the free end 10' thereof, in order to overcome or equalize the weight of the bait as well as to hold the catch 11 in line with the finger 12. Suitable guides may be provided, as shown at 15, to at all times hold the lever in a fixed position.

Normally the jaw 7, occupies the position shown in Figs. 1 and 2. When setting the trap, the free end 10' of the lever 10, is baited and the jaw 7, moved to engage and pass downwardly by the finger 12. The jaw being then on the underside of the finger, will, when released or brought in an upward direction, carry the said finger with it and force it into engagement with the catch of the lever 10, as shown in Fig. 3, the action of setting the trap being thus practically automatic. As is obvious, only a slight pressure on the free end of the lever is necessary to trip the finger and release the jaw. The pedal 10' of the lever 10 is primarily designed to trip the catch 11, and release the jaw. On it may be placed the bait, however it is preferable to lay the bait in a depression 16, formed in the base 1, and below the pedal 10, which is provided with an orifice 17, in line with said depression, so that the animal will attempt to get the same through said orifice and by so doing entrap itself.

What I claim is:—

1. A trap comprising a metal base having struck up therefrom at right angles two supports, a finger pivotally mounted in said supports, a lever having one end bent upon itself at right angles, said bent end terminating in a catch, the other end of said lever forming a bait receiving pedal, a jaw pivotally mounted on said base, a spring to normally hold said jaw in inoperative position, said jaw being arranged to be held in operative position by said finger engaging said catch, and a spring bearing against the underside of said lever to hold said catch normally in the path of movement of said finger.

2. A trap comprising a metal base having at one end integral supports, a finger pivotally mounted in said supports, a lever having one end bent upon itself at right angles, said bent up end terminating in a catch, and said lever pivotally mounted at the bend, a jaw, a spring to normally hold said jaw in inoperative position, said jaw being arranged to be held in operative position by said finger engaging said catch, a guide for said lever, and a spring bearing against the underside of said lever to hold said catch normally in the path of movement of said finger.

In testimony whereof I affix my signature in the presence of two witnesses.

CHARLES G. DUNCAN.

Witnesses:
ANTON GLOETZNER, Jr.,
E. L. STILWELL.

Copies of this patent may be obtained for five cents each, by addressing the "Commissioner of Patents, Washington, D. C."